(12) United States Patent
Ghani

(10) Patent No.: US 9,891,028 B2
(45) Date of Patent: Feb. 13, 2018

(54) SHOOTING GAME FOR MULTIPLE PLAYERS WITH DYNAMIC SHOT POSITION RECOGNITION ON A PAPER TARGET

(71) Applicant: Rod Ghani, Phoenix, AZ (US)

(72) Inventor: Rod Ghani, Phoenix, AZ (US)

( * ) Notice: Subject to any disclaimer, the term of this patent is extended or adjusted under 35 U.S.C. 154(b) by 0 days.

(21) Appl. No.: 15/474,874

(22) Filed: Mar. 30, 2017

(65) Prior Publication Data
US 2017/0370683 A1  Dec. 28, 2017

Related U.S. Application Data

(60) Provisional application No. 62/493,100, filed on Jun. 22, 2016.

(51) Int. Cl.
| | |
|---|---|
| F41J 5/00 | (2006.01) |
| F41J 5/10 | (2006.01) |
| A63F 13/837 | (2014.01) |
| A63F 13/426 | (2014.01) |
| A63F 13/213 | (2014.01) |
| F41J 5/14 | (2006.01) |
| F41J 5/02 | (2006.01) |

(52) U.S. Cl.
CPC .............. *F41J 5/10* (2013.01); *A63F 13/213* (2014.09); *A63F 13/426* (2014.09); *A63F 13/837* (2014.09); *F41J 5/14* (2013.01); *F41J 5/02* (2013.01)

(58) Field of Classification Search
CPC ........................................ F41J 5/10; F41J 5/02
USPC ...................................... 273/371; 434/16, 20
See application file for complete search history.

(56) References Cited

U.S. PATENT DOCUMENTS

| | | | |
|---|---|---|---|
| 4,898,391 A | 2/1990 | Kelly et al. | |
| 5,775,699 A * | 7/1998 | Orito | F41J 5/10 273/371 |
| 2002/0027190 A1* | 3/2002 | Hellak | F41J 5/02 250/222.1 |
| 2003/0082502 A1* | 5/2003 | Stender | F41G 3/2611 434/23 |
| 2006/0150468 A1* | 7/2006 | Zhao | F41J 5/14 42/119 |
| 2010/0178967 A1 | 7/2010 | Cheng et al. | |
| 2012/0258432 A1 | 10/2012 | Weissler | |
| 2014/0106311 A1 | 4/2014 | Skrepetos | |
| 2014/0367918 A1 | 12/2014 | Mason | |

OTHER PUBLICATIONS http://www.targetshootingapp.com/.

* cited by examiner

*Primary Examiner* — Mark Graham
(74) *Attorney, Agent, or Firm* — Mark V. Loen (57) ABSTRACT

The embodied invention is a method and equipment suitable for a shooting game with dynamic shot recognition and automatic scoring among multiple players firing at the same target. Each player's shot is scored based on a difference in the target's image from a prior image as viewed by a camera. The scoring target is aligned with the camera, and the output of the score change is displayed to the multiple shooters.

21 Claims, 9 Drawing Sheets

SHOOTING GAME FOR MULTIPLE PLAYERS WITH DYNAMIC SHOT POSITION RECOGNITION ON A PAPER TARGET

CROSS REFERENCE TO RELATED APPLICATIONS

This application claims the benefit of U.S. Provisional application No. 62/493,100 filed on Jun. 22, 2016. The prior provisional application is included by reference herein.

STATEMENT REGARDING FEDERALLY SPONSORED RESEARCH OR DEVELOPMENT

Not applicable.

REFERENCE TO SEQUENCE LISTING, A TABLE, OR COMPUTER PROGRAM LISTING

Not applicable.

BACKGROUND OF THE INVENTION

(1) Field of the Invention

This invention is directed to a shooting game where multiple players shoot at the same target in a competitive setting. The score for each player is automatically updated when each player takes their turn.

(2) Description of Related Art

Shooting at targets dates back to antiquity.

In modern times, competitive rifle/pistol scoring is commonly done by shooting at a paper based target with suitable markings for scoring. The shooter's score is determined based on the position of holes made in the target, and scoring markings. An accurate result is determined when the target is closely examined.

Others have worked in the field to improve the scoring. For example, there are shooting scoring apps (i.e. Target Scan app for iOS) where a photographed (or scanned) paper target is examined for the location of the shots and the total score is determined electronically. To improve the accuracy of the scoring, a lighted background (or white background paper) is added behind the target to contrast the target vs the openings created by a shot. The system then distinguishes the center of a shot from the area weighted geometry of the hole. The software can have difficulty recognizing a shot accurately, and a manual option is given to the user to correct or place a shot to be scored.

Similarly, CN1347040 also describes a scoring system where a target with bullet holes is analyzed for scoring. However, no disclosure was made as to how a shot was located in the camera image frame, and how a score was determined.

US patent application US20140106311 describes a shooting training system where a shot is displayed to the shooter by alternating views of the current target vs an image capture the target image before the latest shot. This system only captures images and does not generate an automatic score, and does not determine a shot location in any camera image capture.

There are problems with this type of scoring system. In a shooting competition, it can take an undesirable amount of time to determine a score for a shooter vs other competing shooters. Multiple targets have to be retrieved, scanned, and the results have to be tabulated manually for each player. A target scanning type of scoring system does not lend itself to instant updates on a shooter's score. Such delays in retrieving a score dampens the sense of competition among the shooters. Also, the scanning systems cannot separate the score between multiple shooters on the same target.

Similarly, US patent publication no. 20100178967 and U.S. Pat. No. 4,898,391 describe a shooting game with a target and a gun that sends a beam of light to a game console for scoring against the target. Unfortunately, this type of scoring system does not use a gun which fires real bullets and is a less satisfying game to play.

Currently, during a shooting competition match, the paper target is often at a significant distance and binoculars or other visual aids must be used to estimate the current score. The end result is that the exact score is difficult to determine until the match is over. US20140106311 describes a method whereby the target is monitored by a remote camera and the target image is sent back to a player. However, this system does not provide any automated scoring.

Shooting in a multi-player competition often requires a separate shooting lane for each player, and this can be expensive, particularly in an indoor shooting situation. Also, each player is not able to watch the other player shoot.

It is possible for multiple shooters to compete in a single lane and have each player shoot at their target in sequence. However, this is less desirable in a competitive shooting situation as the target must be retrieved for each player and scored separately. A new target has to be placed (manually or automatically) at the shooting distance. These types of delays diminish the competitive environment due to the loss of playing momentum.

What is needed is an instant type of scoring system where multiple players shoot at the same target in a competition in a way which adds to the feeling of competitive tension in the game. The current art lacks this important feature. It is preferable that a shot by shot competition be created where each incremental score is shown to all of the shooters, thereby adding increasing game tension. The tension will increase as the game progresses, and may be very high for the last two or three shots. This can lead to a very satisfying competition and elated feelings for the victor, or victorious team.

BRIEF SUMMARY OF THE INVENTION

The embodied invention is a method and equipment suitable for a shooting game with dynamic shot recognition and automatic scoring among multiple players firing at the same target. Each player's shot is scored based on a difference in the target's image from a prior image as viewed by a camera. The scoring target is aligned with the camera, and the output of the score change is displayed to the multiple shooters.

Important game enhancements include a dynamic update of the reference target image to follow multiple shot holed. When a significant change is detected from a reference target image, a shot event is recognized and the area of change identified for the placement of the shot. The shot score is then accumulated in a display that is viewable by all players.

DETAILED DESCRIPTION OF THE INVENTION

The embodied shooting game is a competition among different players who shoot at the same target. A camera monitors the target and relays the target image to a screen that is viewable by all players. The players, in turn, shoot at the target and the shot hole is automatically recognized by looking for a significant change in the target image from shot to shot. The shot placement is identified and a display marker is placed over the shot hole on the target. The camera image is also automatically scrutinized to determine the score of the shot. The current shooters overall score is updated and displayed on a game screen. When the first player completes his/her turn, the next player becomes the shooter.

The conceived game is based on two to four shooters per game, and the number is adjustable based on a setup that is logged into the display equipment. Each shooter gets 5, 7, 10, 14, or 20 shots. Each player in turn utilizes a button to switch the scoring to the next player.

A 1080p wireless camera (1080×1920 pixels) with over 2 million pixels is used to monitor the paper target, and the paper target is mounted inside a metal frame. The frame is designed to fit the target paper tightly so that the alignment between the camera is maintained and a set up calibration is not needed when a new game is started. A fit of 1/32" or tighter is preferred between the target paper and the frame. The camera is positioned in front of the target, and above it, so that the camera obtains a high resolution image of the target. The alignment between the target and the camera is a set up function at the beginning of the game, or previously established. Preferably, the camera is kept at a fixed distance and position from the target to simplify the set up and accuracy of the cameras image.

The camera, and automatic image post processing, must be able to recognize when a shot is made and score it accurately. This is done by continuously monitoring the output of the target camera and observing when there is a significant image pixel change.

The ability of the camera to recognize a shot depends partly upon the signal to noise ration. Modern digital image sensors in cameras have known errors that create signal noise. In general, the total noise is dependent on the noise factor, background, readout noise, and EM gain. The sensor noise must be filtered out in order to recognize a shot.

In one embodiment of the invention, a single board computer is used to interface between the camera and the scoring display. The single board computer is suitably programmed to perform the automatic scoring functions and display any scoring on the game display.

The game display may be any type of display that has a high enough resolution image. Typical game displays would include especially 1080p capable high definition TVs and monitors. There is no preference for plasma, LED, or LCD televisions.

At the end of a game round, the total score for each shooter is automatically computed and displayed under each player's name. The players help the game by clicking on their name when switching shooters.

Typical target scanning is done by using an 1080p camera viewing a 18" wide by 24" tall target. Pixel changes due to a bullet impact in an image frame are used to identify a shot. The image from the camera is continuously monitored to recognize the location of the shot and score it accurately.

Figure 1:
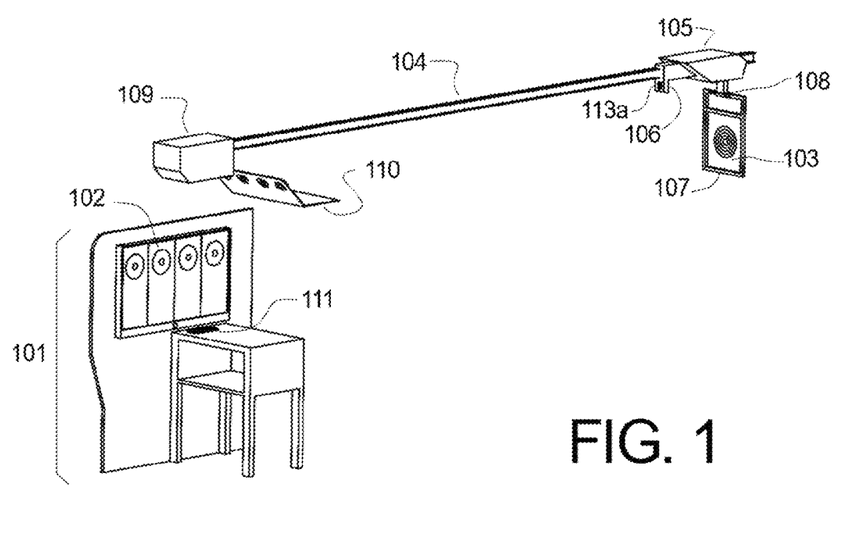
FIG. 1 shows a shooting gallery lane designed for the multi-player target game system.

To aid in understanding the game, FIG. 1 shows significant elements of the game setup. A players stand for shooting 101 has a game display 102 which displays multiple players on the screen. The output of the wireless camera displays the current target image. Each players score, the target, and marks of their shot positions are also shown on the scoring display. A keyboard (or a dedicated control box) include next player, previous player, display, game start, game setup, and game end. Also, a setup screen is used to pick the target type, number of players per game, the ammunition type, and the number of shots per player.

The target assembly 110 is shown in FIG. 1 The paper target 103 is housed inside a metal frame 107 and connected to the motorized target trolley 105 through a mounting clip 108. The motorized target positioner moves on a rail 104 to set the target at the correct distance from the player. The target camera 106 is attached to the target positioner with a good and clear view of the target.

Figure 2:
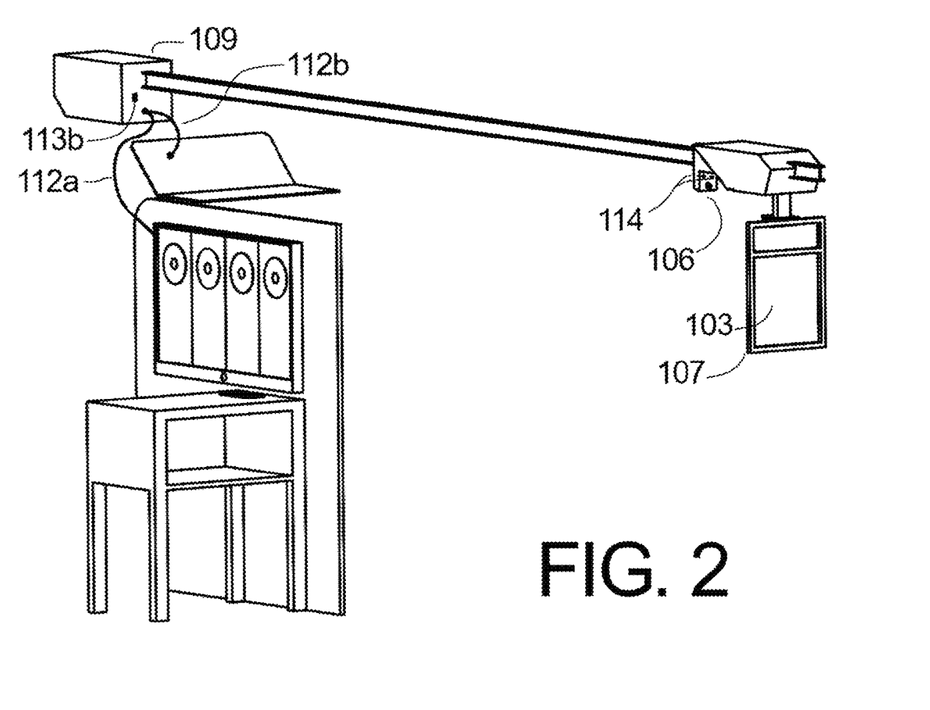
FIG. 2 shows a detail of FIG. 1.

A target frame attaching clip 108 connects the target frame 107 with the target trolley 105. The trolley rides on the rail 104 and travels to the charging station 109 during the normal course of shooting. An additional (optional) overhead game display 110 provides game status to the players. The charging station is connected via communication cables 112a,b to the game displays (FIG. 2). The target trolley is battery operated, and charges at the charging station through contacts 113a,b (FIGS. 1 & 2). LED lighting 114 is used to illuminate the target.

When a shot hits the paper target 103 (or inadvertently hits the metal target frame 107), there can be a significant motion on the target due to the impact, causing a local area to move backward. Also, the bullet impact can cause the target to shift in position, relative to the camera, with vibration or motion. This vibration can cause a significant enough change for a group of pixels to falsely report an area of where a shot has penetrated the target. The vibration can also be subtle, with the impact of the bullet causing a change in reflectivity on the target surface, also causing a significant enough change for a group of pixels to falsely report an area of where a shot has penetrated the target.

To minimize the effect of the target vibration and reflectivity changes, the frequency of how often the target image is analyzed can be varied to a more suitable time to allow the target and camera vibration to dissipate. An interval of 1 second has been found to be optimal in improving the reliability and accuracy of determining the shot location.

The camera view of the target is distorted as the angle of the target is not perpendicular to the camera view. The angle depends upon the position of the camera, which is preferably above the target. This is not a concern as to identifying the shot, but is important in scoring each shot correctly. The lower edge of the target is narrower than the top. The result is that there are fewer pixels per inch at the bottom edge of the target than at the top.

To facilitate improved reliability and to simplify the equipment needs, the wireless camera is powered by a battery that is rechargeable. The battery connects to a recharging station when target positioning assembly is moved to the players stand. In a preferred embodiment, the motorized target positioner is also battery driven.

The target image is preferably taken from the camera 106 with a 1080p resolution. The sensor in the camera is a CCD type or a CMOS type. Typically, to obtain a color image, cameras use a Bayer color filter array. The Bayer color filter array includes red, green, and blue light filters in a mosaic grid pattern in front of the individual camera pixel sensors. Typically, the Bayer 2×2 pixel filter grid comprises a green and red color filter in the first row, and then a blue and green color filter in the second row. This 2×2 filter grid is repeated over the entire camera image sensor.

Since each camera pixel sensor only registers the light intensity of one color, the intensity of the other two color values at that sensor pixel are not known, and is missing information. To create an image file with fine detail, the other two colors at each of the four camera sensor pixels are interpolated using a de-mosaicing algorithm. This can be done in the camera or in a post processing algorithm.

Typical de-mosaicing algorithms include copying the colors from neighboring sensor pixels, averaging different colors from nearby sensor pixels, or using linear interpolation of nearby colors. The goal is to reasonably estimate all three colors at each camera sensor pixel.

In an alternate embodiment, the camera is a black and white camera and the color information is ignored.

Figure 3:
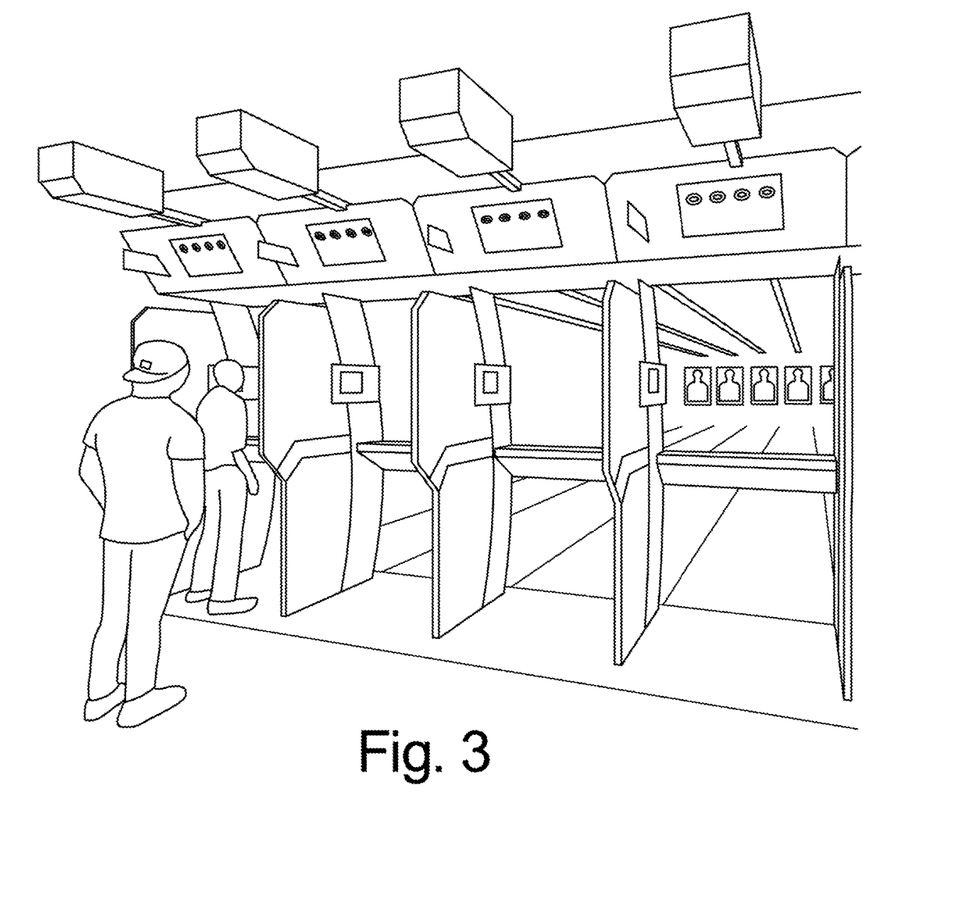
FIG. 3 is a player's view of the shooting gallery.

FIG. 3 is a player's view of the shooting gallery. As shown, players stand behind the table and fire at the target. A display is shown above the players to identify which player is shooting and each players score.

Figure 4:
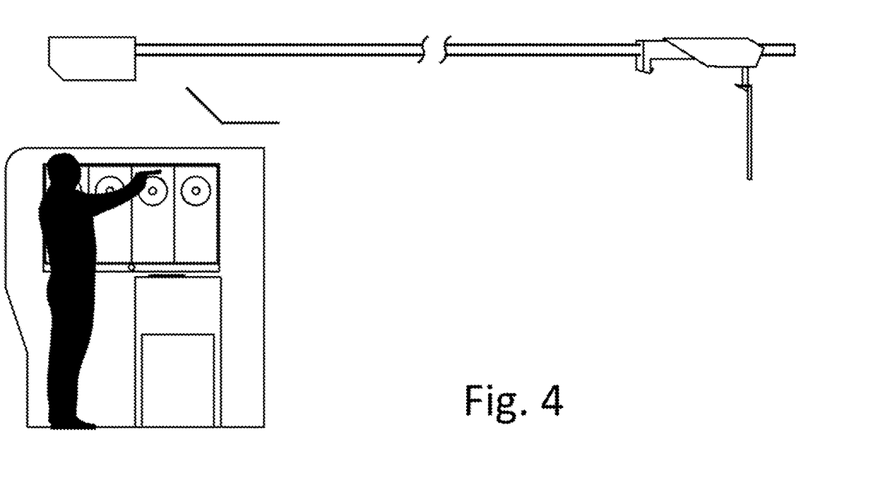
FIG. 4 is a simplified profile view of the shooting gallery.

FIG. 4 is a an alternate view of the shooting gallery showing a computer that is used as a shot record and a user interface.

Figure 5:
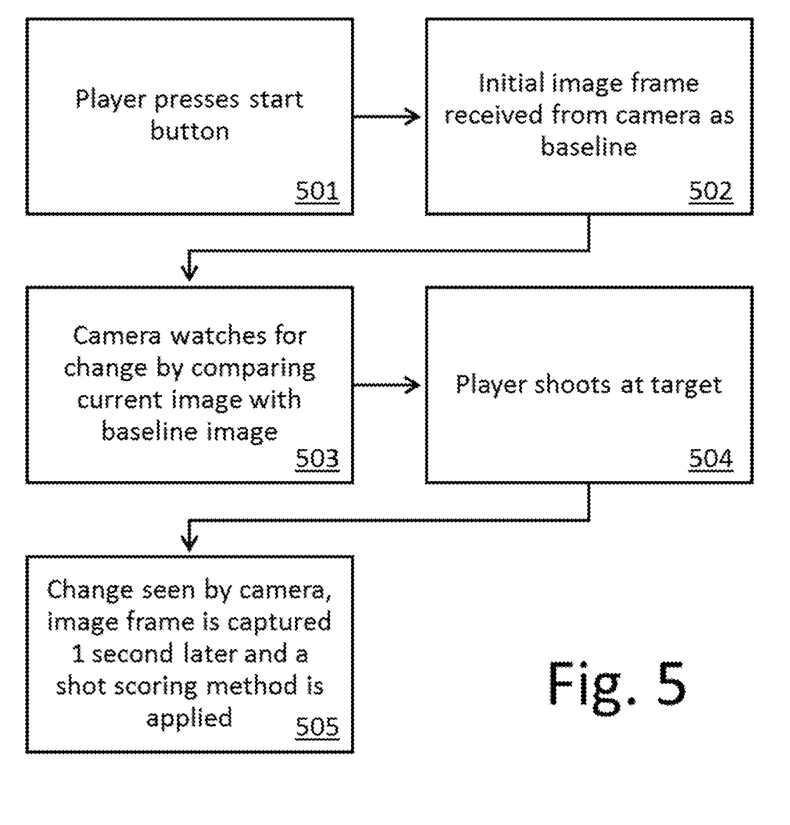
FIGS. 5 and 6 are block diagrams for how the latest shot is recognized and the score is determined.

In FIG. 5 the first player to shoot presses start button 501 to begin their shooting turn. The camera captures a continual baseline image frame 502 of the target from the continuous target camera video stream. The target camera then watches for a significant change in the target 504 by comparing current image with the previous baseline image 505. A shot will be recognized when there is a significant pixel count with changes 503. A shot will be recognized when more than 0.02% of the pixels change from image to image.

Typically, a video frame (i.e. shot image) is captured after 1 second after the shot to determine the score. This avoids issues with any slight target motion or changes in reflectivity from the shot impact. The shot scoring method determines where the shot occurred on the target and updates the player score. The one second criteria is adjustable.

Figure 6:
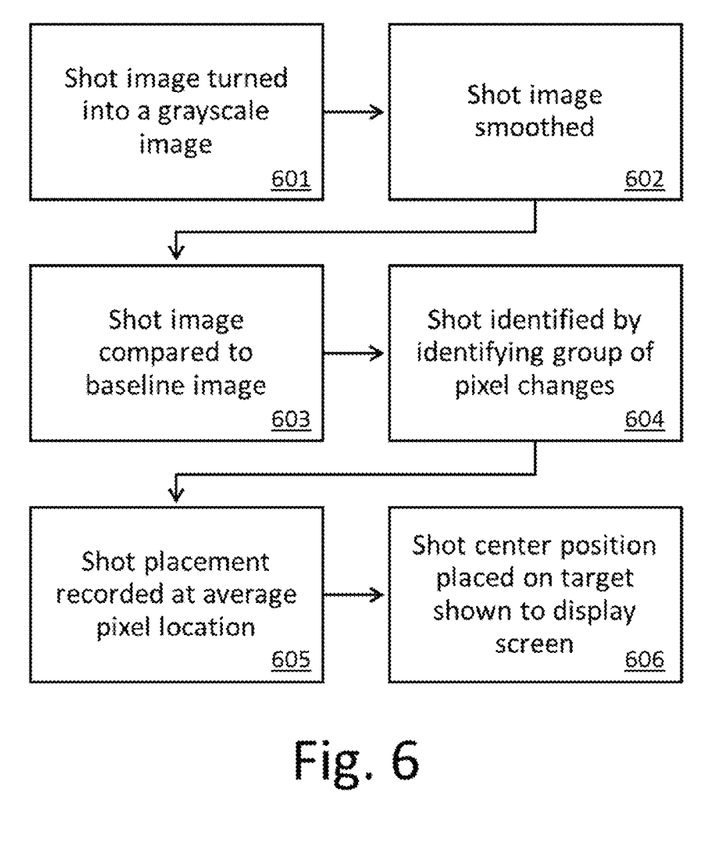

FIG. 6 is a block diagram that shows how a shot is recognized. The camera records a target image at a frame rate of 60 frames per second. A baseline target image is dynamically maintained at a predetermined interval (typically an image 1 second previously) relative to the current target image frame transmitted by the camera.

1. The current target image is turned into a grayscale image by averaging the Red-Green-Blue (RGB) colors in each target image pixel 601
2. The current target image is smoothed by averaging each target image pixel with the surrounding neighbor pixels (i.e. surrounding 8 pixels, 5 pixels at the image edges) 602. This helps to eliminate camera sensor noise.
3. The current target image is compared to the baseline target image to identify any pixels with a change in value 603.
4. The shot is recognized by looking at each pixel with a change and examining the surrounding 1×1 inch area. When the pixel change count in the 1×1" surrounding area is more than a threshold value (such as 25%), a shot is recognized as having taken place 604.
5. For scoring and identification purposes, the center of the shot is placed at the average x, y image pixel location with a change. This is narrowed to the shot recognized 1×1" area 605.
6. The shot center position is then scaled to the target image, scored, and reported to display screen 606.

The average value for the x and y coordinates of the changed pixels identify the center of the shot on the target. To identify the shot on the game display, scoring marker (a circle or square) is then fitted around the pixels with a significant change. Typically, the scoring marker is a fixed size. For scoring purposes, the most important value is the location of the shot center in reference to the score markings on the target 604.

Figure 7:
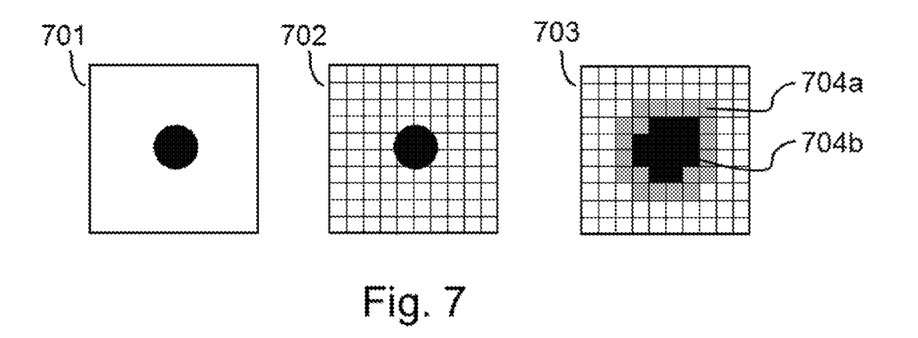
FIG. 7 illustrates how the camera pixel sensors and an averaging filter are used to identify a shot location.

FIG. 7 is an additional information as to how the digital camera recognizes a new hole position. A bullet hole is shown inside a 1"×1" area 701, which is made during a shooting game. To identify the image change due to the new hole, the 1"×1" area surrounding the hole is overlaid on top of a 10×10 grid representing camera resolution 702 of 10 pixels per inch, The bullet hole is seen by the individual camera pixels 703, and some pixels are directly affected and change in light intensity 704b due to the hole (black dot) no longer reflecting light. In this illustration, 13 pixels have light intensities are directly changed to at least a small degree (i.e. black dot is touching). When the shot is filtered to grayscale and run through the neighbor pixel averaging filter, neighboring pixels 704a are also changed in value due to being averaged with the directly affected pixels. In this illustration, 20 additional neighboring pixels are changed. A shot is recognized because 33% of the pixels in the 1×1" area are recognized as having been changed, and this is above the 25% threshold.

To accurately place the shot position on the target, any distortion between the camera and the target has to be corrected. The distortion correction is accomplished by mapping each pixel from an (row, column) position to a (height, width) position.

Figure 9A:
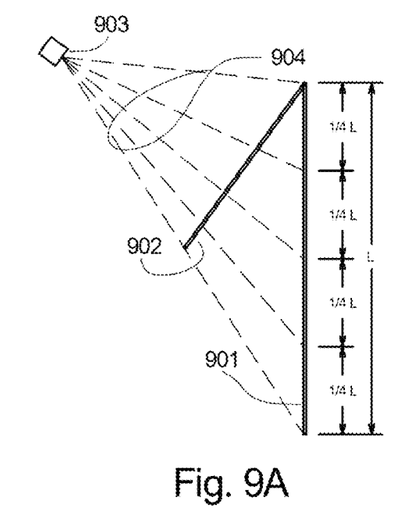
FIGS. 9A-9B illustrate how the target image distortion is corrected when a camera is located above the target.
Figure 9B:
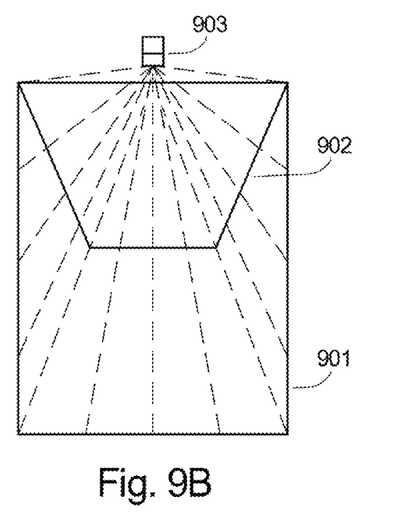

The goal of distortion correction is to accurately re-create the target image and display it to the user. FIGS. 9A-9B illustrate how the image is distorted which allows for a methodology to adjust the camera image.

FIG. 9A, shows how an image is distorted due to the position of the camera, and how the image will be seen by the camera. The target 901 has a projected image plane 902 which is perpendicular to the camera 903 orientation. Evenly spaced dashed lines 904 at the target 901 edge pass through the projected image plane to the camera, which shows how the image is distorted due to the position and viewpoint of the camera. The camera sees the projected image on the projected image plane 902. This causes the lower portion of the target to be compressed in the camera view as seen on the projected image plane 902.

FIG. 9B is a left side view of FIG. 9A. In FIG. 9B, the projected image plane 902 is shown across the width and projected (dashed) lines show how the edges of the target image is sent to the camera. Upon examination, it is seen that the largest adjustment to the camera image is adjusting the vertical height of the image, particularly on the lower portion. The height adjustment is not linear. The horizontal image will receive corrections and the distortion changes as a function of height.

To correct the target distortion, one embodiment is to map out a grid of changes in a matrix format, based on the projected geometry, and then apply the change grid to the image. This will establish a variable scaling and re-positioning of an image pixel based on the row and column to an x,y position. The change grid can be established on graphic plotting at chosen grid points, such as every 2×2 inches, and then linear interpolating between the chosen grid points to establish a corrected (x,y) position for each image pixel. Although time consuming to establish, a grid/interpolating system can be effective as it involves basic matrix math and is relatively easy to understand. 3D computer aided drafting (CAD) can be helpful in establishing projecting geometry.

Another embodiment is to use analytic geometry to identify the intersection of a line with a plane. The first point of the line is the camera position $(x_1, y_1, z_1)$ and the second point of the line is a position $(x_2, y_2, z_2)$ of an image pixel as taken by the camera. All of the camera image pixels are located in a plane perpendicular to the camera orientation. The target is the intersecting plane with a plane equation of $ax+by+cz=d$ where a, b, c, and d are constants. Utilizing known analytic geometry methods, the equation of the line defined by the camera and image pixel can be projected onto the target plane. This method can be used to establish a target position (x,y,z) for each image pixel (row, column), effectively correcting camera distortion.

In either method, the image correction can be verified by utilizing a target with easily recognizable shapes (circles, equilateral triangles, squares, crosses, etc) to determine if an image that is taken by the camera is corrected satisfactorily.

In a preferred embodiment, the camera is located above the target and in close proximity to it. This means that the camera is no further distance to the target than the maximum width or the maximum height. Since the camera is preferably located above the target, and out of the way of shooting, the camera resolution per inch will be greater for the top portion of the target, and somewhat lower for the lower portion of the target. This adjustment in scale must be accounted for in the shot placement. Typical view angles between the camera and the target are 0 to 60 degrees (as measured from the horizontal plane), but this is not a strict requirement.

It is known that digital camera sensors have noise when taking a picture or capturing a video frame. To that end, each pixel is gray-scaled by averaging the pixel RGB values. Additionally, and to smooth out any target image pixels that might be incorrectly identified as a pixel change, each pixel is then averaged with its immediately surrounding eight pixels. If an image pixel is on the edge of the sensor, then the pixel image is averaged with the five surrounding image pixels. This creates an effective filter that smooths out image problems.

A particular problem with shooting is vibration of the paper target due to the shot penetration. The target can vibrate in the area of the shot causing the reflectivity of the target image to change immediately following the shot. This creates unpredictable pixel changes and potential shot misplacement. To avoid an inaccurate shot placement, the target is allowed to recover for approximately 1 second before a scoring placement is made.

When working with the camera and lighting, it was discovered that the frequency (i.e. 60 Hz) of the lighting on the target can cause difficulties with shot recognition. The camera scanning frequency may match that of the lighting frequency and this can cause a target image shadow to be read as a changed target image frame. Consequently, a DC (direct current) based lighting system is preferred, such as a light emitting diode (LED) which is powered by a constant voltage power supply (DC).

To further refine the shot recognition, the entire target is examined for a significant change, pixel by pixel. If a cluster of changes are detected in a 1"×1" square surrounding the changed pixel, then a shot is recognized. The threshold of determining a shot is a value that is empirically determined. During a test on a typical web-cam type camera with a CMOS sensor, a threshold of 25% was determined to be a good balance between sensitivity in detecting a shot and avoiding sensor noise which causes a false shot recognition. Other threshold values are possible based on the type of camera chosen and the amount of camera sensor noise. A camera with a low noise sensor, for example, will use a lower threshold that better identifies overlapping shots.

A typical camera that is useful for shot recognition will have an 8 bit resolution and captures color images. Also, a camera with a low sensor noise ratio is helpful in minimizing the amount of filtering required. Shot recognition is improved with a low signal to noise ratio. The camera could equally be a black and white which outputs a grayscale image. In this case, the grayscale image conversion is not necessary.

Figure 8:
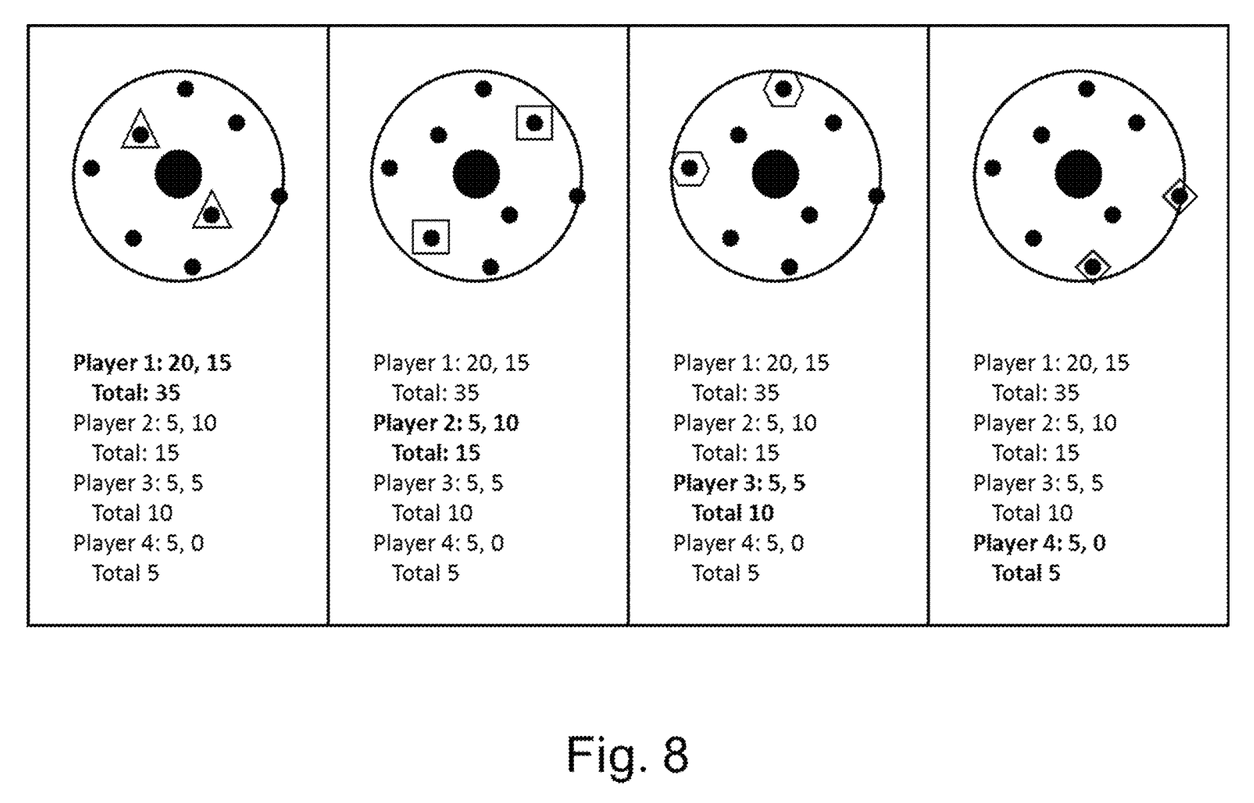
FIG. 8 is a game display showing the players their score and shot positions.

FIG. 8 shows a game display. Up to four players can shoot, and their individual shot scores (bold letters) along with a total for each player is shown. The individual shot locations have been identified and marked with an individualized geometric marker, such as a triangle, square, hexagon, and rhombus. Other marker geometry could equally be used.

The shot can be scored based on either the distorted camera image or the corrected target image utilizing the target score markings. It is important that the score is accurate, relative to the location of the markings on a distorted or corrected image. In one embodiment, the position of the shot can be mapped based on a score mapping on the camera image. The row and column position of each pixel can be grouped and assigned to a particular score.

Figure 10:
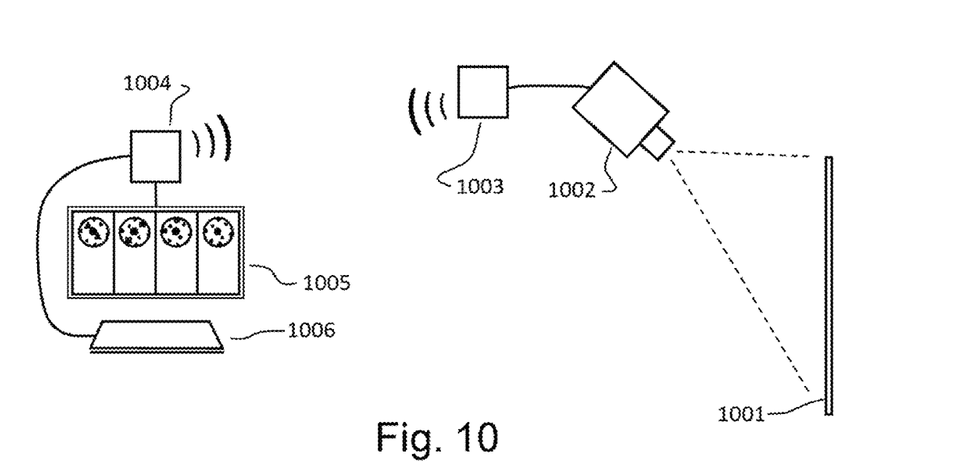
FIG. 10 shows communication flow between equipment components.

FIG. 10 shows communication flow between equipment components. In a preferred embodiment, the camera 1002 views the target 1001 and is hardwired to a small dedicated single board computer 1003 which wirelessly communicates to a game computer 1004 which is hardwired to the game display 1005. A user interface 1005 (keyboard, button board) is hard wired to the game computer 1004.

The single board computer is generally conceived to include a CPU, both volatile and non-volatile memory, an operating system, onboard communications between distinct components, a wireless transmitter, and suitable software programming to execute non-transient computer instructions. For example, the single board computer could be selected from the portfolio of the Raspberry Pi single board computers as manufactured by the Raspberry Pi Foundation (United Kingdom).

Figure 11:
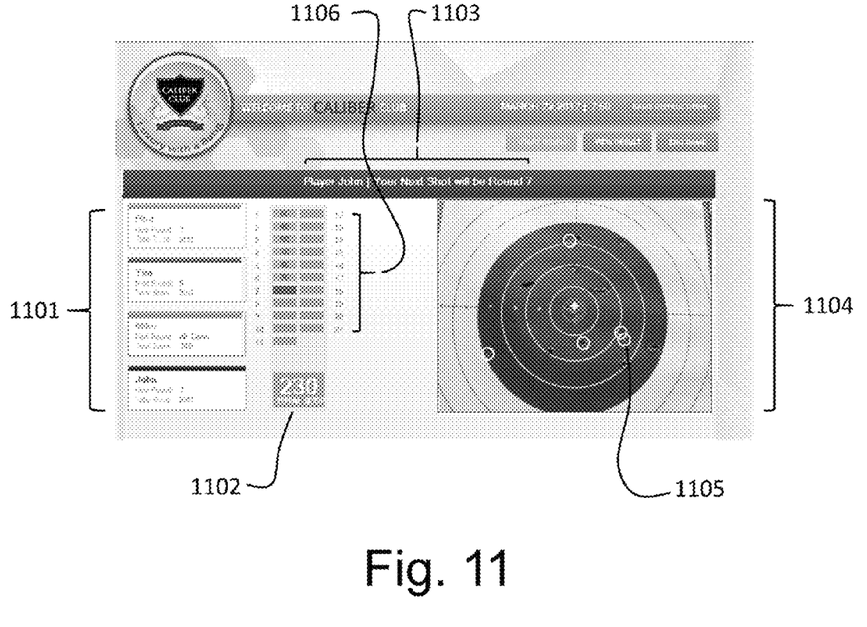
FIG. 11 shows a typical game display partway through the game showing additional features.

FIG. 11 shows a shooting game, partway through game completion. A player list 1101 on the left side show the current player up to make the next shot. The current player's total score 1102 is displayed. A header text 1103 indicates the current player and current player's round. A list of the current player's shots along with the score per shot is displayed in a list 1106. A current target image 1104, along with display markers 1105 on current player's recognized and scored shots is shown. This information on the display is helpful for game clarity and to enhance the game competition by having feedback on any game status questions the players may have.

Each described embodiment incorporates image processing equipment comprising one or more Central Processing Units (CPUs), volatile Random Access Memory (RAM), non-volatile storage such as Electronically Erasable Programmable Read Only Memory (EEPROM), flash, optical disk, magnetic disk, or solid state memory such as a solid state disk or a micro SD card. The described embodiments possesses at least one digital camera systems which may utilize an image sensor such as a complementary metal-oxide-semiconductor (CMOS) or CCD, and the necessary electronic circuitry to transmit the captured images for further image processing.

Alternate embodiments for the single board or game computer may contain a Graphics Processing Unit (GPU) with methods to split the computational workload between the CPU and GPU. The described embodiments include a user interface that provides for the user to Each embodiment may possess a means of inputting user commands such as a keypad, keyboard, microphone, accelerometers, or touchscreen. Each embodiment may contain an internal battery, accept interchangeable batteries, or receive power from an outside source such as mains power. Each embodiment may contain a wired or wireless network interface to enable communication to and from external devices. Although not necessarily utilized, a visual output device such as a monitor or touchscreen may be included within any embodiment.

Digital cameras operate by recording light incident upon their sensors. There are many types of acceptable cameras with suitable image resolution to identify a new hole made in the target. The conceived digital camera is preferably directly connected to the single board computer via technologies such as Universal Serial Bus (USB), FireWire, and ethernet. Wireless transmissions from the single board computer include standards such as Bluetooth, WiFi, and cellular networks. The digital camera may also communicate via a Serial Interface or a Parallel Interface.

As used herein the terms single board computer and computer system are intended to refer to a computer-related entity, comprising either hardware, a combination of hardware and software, software, or software in execution capable of performing the embodiments described. The disclosed embodiments which use the single board computer refer to being interfaced to and controlled by a computer readable storage medium having stored thereon a computer program. The computer readable storage medium may include a plurality of components such as one or more of electronic components, hardware components, and/or computer software components. These components may include one or more computer readable storage media that generally store instructions such as software, firmware and/or assembly language for performing one or more portions of one or more implementations or embodiments of an algorithm as discussed herein. These computer readable storage media are generally non-transitory and/or tangible. Examples of such a computer readable storage medium include a recordable data storage medium of a computer and/or storage device. The computer readable storage media may employ, for example, one or more of a magnetic, electrical, and/or optical data storage medium. Further, such media may take the form of, for example, floppy disks, magnetic tapes, CD-ROMs, DVD-ROMs, hard disk drives, micro SD cards, standard SD cards, and/or solid-state or electronic memory. Other forms of non-transitory and/or tangible computer readable storage media not list may be employed with the disclosed embodiments.

A number of such components can be combined or divided in an implementation of a computer system. Further, such components may include a set and/or series of computer instructions written in or implemented with any of a number of programming languages, as will be appreciated by those skilled in the art. Computer instructions are executed by at least one central processing unit. In addition, other forms of computer readable media such as a carrier wave may be employed to embody a computer data signal representing a sequence of instructions that when executed by one or more computers causes the one or more computers to perform one or more portions of one or more implementations or embodiments of a sequence.

While various embodiments of the present invention have been described, the invention may be modified and adapted to various operational methods to those skilled in the art. Therefore, this invention is not limited to the description and figure shown herein, and includes all such embodiments, changes, and modifications that are encompassed by the scope of the claims.

I claim:

1. A shooting game with a dynamic scoring system comprising:
    A) a target mounted in a support frame,
    B) a digital camera mounted on said support frame with a sensor resolution of at least 2 million pixels,
    C) wherein said digital camera is located above the target with a view of the target,
    D) wherein a distance of said digital camera to the target is not greater than the maximum of:
        a) the width of said target, or
        b) the height of said target,
    E) wherein a constant light illuminates the target,
    F) a sequential hole made in the target during the shooting game,
    G) wherein said digital camera captures video images of the sequential hole made in the target,
    H) wherein the video images incorporate said target and are displayed on at least one game display,
    I) wherein the video images are processed by image processing equipment to determine a location of a new hole in the target by comparing a current image to a prior image substantially one second earlier, wherein said current image is free of shot vibration,
    J) wherein said location of the new hole is recognized when at least 0.02% of pixels change from said current image to said prior image,
    K) correcting the location of the new hole for vertical and horizontal distortion,
    L) scoring the new hole in the target relative to scoring markings on the target,
    M) displaying a marker on the game display that identifies the most recent target hole location, and
    N) updating the shooting game score.

2. The shooting game according to claim 1 wherein the video images are processed by the image processing equipment to determine the location of the new hole in the target by the steps comprising:
    A) converting the video images to grayscale images,
    B) filtering the grayscale images by averaging the RGB values of sequential image pixels with immediately surrounding sequential image pixels,
    C) comparing the filtered grayscale images to identify any image pixel change from a prior baseline image, D) wherein said prior baseline image is substantially 1 second in the past,
E) examining a surrounding one square inch area of any changed pixel for other changed pixels and performing a changed pixel count in the one square inch area,
F) identifying the new hole when the number of changed pixel counts in the one square inch area exceeds a threshold value of 25%, and
G) identifying an averaged pixel location of the new hole based on an average changed pixel location in the one square inch area.

3. The shooting game according to claim 1 wherein said digital camera is at a fixed distance to said target for any distance between said target and a player.

4. The shooting game according to claim 1 wherein said digital camera is located at a protected position on a target trolley.

5. The shooting game according to claim 1 wherein said image processing equipment is a single board computer.

6. The shooting game according to claim 5 wherein a wireless connection is used between said single board computer and the game display.

7. The shooting game according to claim 1 wherein the game display shows sequential shot numbers and associated said shooting game score.

8. The shooting game according to claim 1 wherein a current player in a list of a plurality of players is shown on the game display.

9. The shooting game according to claim 8 wherein said current player presses a button to begin their turn.

10. The shooting game according to claim 1 wherein said shooting game score for a plurality of players is shown on the game display.

11. The shooting game according to claim 10 wherein a point system is used to determine a score for the new hole.

12. The shooting game according to claim 11 wherein a shot grouping for said plurality of players is shown on the game display.

13. The shooting game according to claim 11 wherein said plurality of players switch screens on the game display by using a keyboard or button.

14. The shooting game according to claim 1 wherein the new hole scoring is calculated by a single board computer.

15. The shooting game according to claim 10 wherein a player's name is associated with a total score for each of said plurality of players.

16. The shooting game according to claim 10 wherein said plurality of players select 5, 7, 10, 14, or 20 shots per game.

17. The shooting game according to claim 7 wherein analytic geometry is used to correct the location of the new hole.

18. The shooting game according to claim 7 wherein matrix math is utilized to correct the location of the new hole.

19. The shooting game according to claim 3 wherein individual shots and total scoring are shown on the game display for each of said plurality of players.

20. The shooting game according to claim 1 wherein a setup screen is used to select a next player, a previous player, game start, and game end.

21. The shooting game according to claim 1 wherein said target is made from paper.

* * * * *